US008634952B2

United States Patent
Kazama et al.

(10) Patent No.: US 8,634,952 B2
(45) Date of Patent: Jan. 21, 2014

(54) FAN CONTROL METHOD AND MEDIUM STORING FAN CONTROL PROGRAM

(75) Inventors: Satoshi Kazama, Kawasaki (JP); Yasushi Hara, Kawasaki (JP); Yoshiyasu Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 324 days.

(21) Appl. No.: 13/220,221

(22) Filed: Aug. 29, 2011

(65) Prior Publication Data

US 2012/0053734 A1 Mar. 1, 2012

(30) Foreign Application Priority Data

Sep. 1, 2010 (JP) ................ 2010-195936

(51) Int. Cl.
| G06F 17/00 | (2006.01) |
| G05D 23/00 | (2006.01) |
| G01C 17/38 | (2006.01) |
| G01L 27/00 | (2006.01) |
| G01K 15/00 | (2006.01) |
| G01K 1/08  | (2006.01) |

(52) U.S. Cl.
USPC .............. 700/117; 700/90; 700/95; 700/299; 700/300; 702/96; 702/98; 702/99; 702/132

(58) Field of Classification Search
USPC .......... 700/90, 95, 117, 299, 300; 702/96, 98, 702/99, 132; 361/687–688
See application file for complete search history.

(56) References Cited

U.S. PATENT DOCUMENTS

| 5,752,011 | A  | * | 5/1998  | Thomas et al. ............... 713/501 |
| 5,974,557 | A  | * | 10/1999 | Thomas et al. ............... 713/322 |
| 6,349,385 | B1 | * | 2/2002  | Kaminski et al. ............. 713/300 |
| 6,931,306 | B2 | * | 8/2005  | Frankel et al. ................ 700/300 |
| 7,308,340 | B2 | * | 12/2007 | Matsuoka et al. ............ 700/300 |
| 7,617,020 | B2 | * | 11/2009 | Chang et al. .................. 700/300 |
| 2005/0174737 | A1 | * | 8/2005 | Meir ............................ 361/697 |
| 2007/0162160 | A1 | * | 7/2007 | Chang et al. .................... 700/25 |
| 2013/0117594 | A1 | * | 5/2013 | Thomas et al. ............... 713/322 |

FOREIGN PATENT DOCUMENTS

| JP | 2001-144484 | 5/2001 |
| JP | 2003-076444 | 3/2003 |
| JP | 2010-108324 | 5/2010 |

OTHER PUBLICATIONS

Japanese Office Action mailed Oct. 15, 2013 for corresponding Japanese Application No. 2010-195936, with English-language translation.

* cited by examiner

Primary Examiner — Ronald Hartman, Jr.
(74) Attorney, Agent, or Firm — Fujitsu Patent Center (57) ABSTRACT

A fan control method performed by a computer having a processor and a fan includes predicting a load of the processor for a job to be executed by referring to a memory that stores information on the load of the processor according to a job type, determining fan rotation control according to a temperature of the processor under the load, and controlling the fan according to the determined fan rotation control.

5 Claims, 11 Drawing Sheets

FIG. 1

RELATED ART

| JOB | MAXIMUM CPU LOAD |
|---|---|
| JOB A | 5% |
| JOB B | 15% |
| JOB C | 7% |
| JOB A + JOB B | 18% |
| JOB A + JOB C | 9% |
| ⋮ | ⋮ |

| CPU LOAD | CPU TEMPERATURE |
|---|---|
| ⋮ | ⋮ |
| 20% | 40°C |
| 21% | 40°C |
| 22% | 41°C |
| ⋮ | ⋮ |

| CPU TEMPERATURE | ROTATION SPEED |
|---|---|
| ⋮ | ⋮ |
| 40°C | 60% |
| 41°C | 62% |
| 42°C | 64% |
| ⋮ | ⋮ |

FIG. 11

FAN CONTROL METHOD AND MEDIUM STORING FAN CONTROL PROGRAM

CROSS REFERENCES TO RELATED APPLICATIONS

This application is based upon and claims the benefit of priority of the prior Japanese Patent Application No. 2010-195936, filed on Sep. 1, 2010, the entire contents of which are incorporated herein by reference.

FIELD

The embodiments discussed herein relate to a fan control method and a recording medium storing a fan control program.

BACKGROUND

Heat sources in electronic devices and the like are generally cooled by causing a fan to rotate. A method for controlling fan rotation includes a technique of detecting the current consumption of boards provided in a device housing and then controlling a fan rotation speed to generate an amount of airflow corresponding to the number of boards based on the detection result. Further, a fan rotation control technique is provided that controls the noise generated by the fan rotation while executing, for example, a special application such as listening to music and the like.

Figure 1:
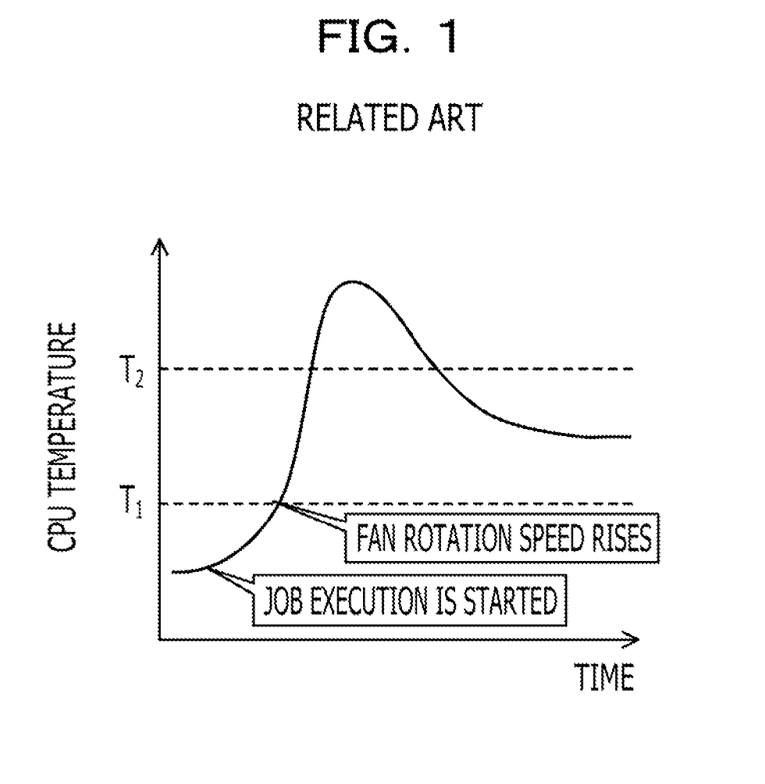
FIG. 1 is a graph illustrating an example of a CPU (central processing unit) temperature curve when increasing fan rotation speed based on the temperature of the CPU.

Temperature variations as illustrated in FIG. 1 may occur when controlling fan rotation based on the temperature of a heat source detected by a temperature sensor. FIG. 1 is a graph with time described on the horizontal axis and temperature described on the vertical axis. When the fan rotation is increased as the temperature of the heat source reaches and exceeds a threshold (T1), no immediate cooling effect is seen as illustrated in FIG. 1. The temperature continues to rise for a short time to exceed a fixed temperature (T2). When the temperature exceeds the fixed temperature (T2) as illustrated in FIG. 1, a function to lower the frequency of an IC (integral circuit) to avoid breakdown is implemented if the heat source is a processor.

When the temperature of the processor rises excessively and the function to lower the IC frequency is implemented in this way, the performance of the processor decreases.

SUMMARY

According to a certain aspect of the invention, a fan control method performed by a computer having a processor and a fan includes predicting a load of the processor for a job to be executed by referring to a memory that stores information on the load of the processor according to a job type determining fan rotation control according to a temperature of the processor under the load, and controlling the fan according to the determined fan rotation control.

The object and advantages of the invention will be realized and attained at least by the elements, features, and combinations particularly pointed out in the claims.

It is to be understood that both the foregoing general description and the following detailed description are example and explanatory and are not restrictive of the invention, as claimed.

DESCRIPTION OF EMBODIMENTS (First Embodiment)

Figure 2:
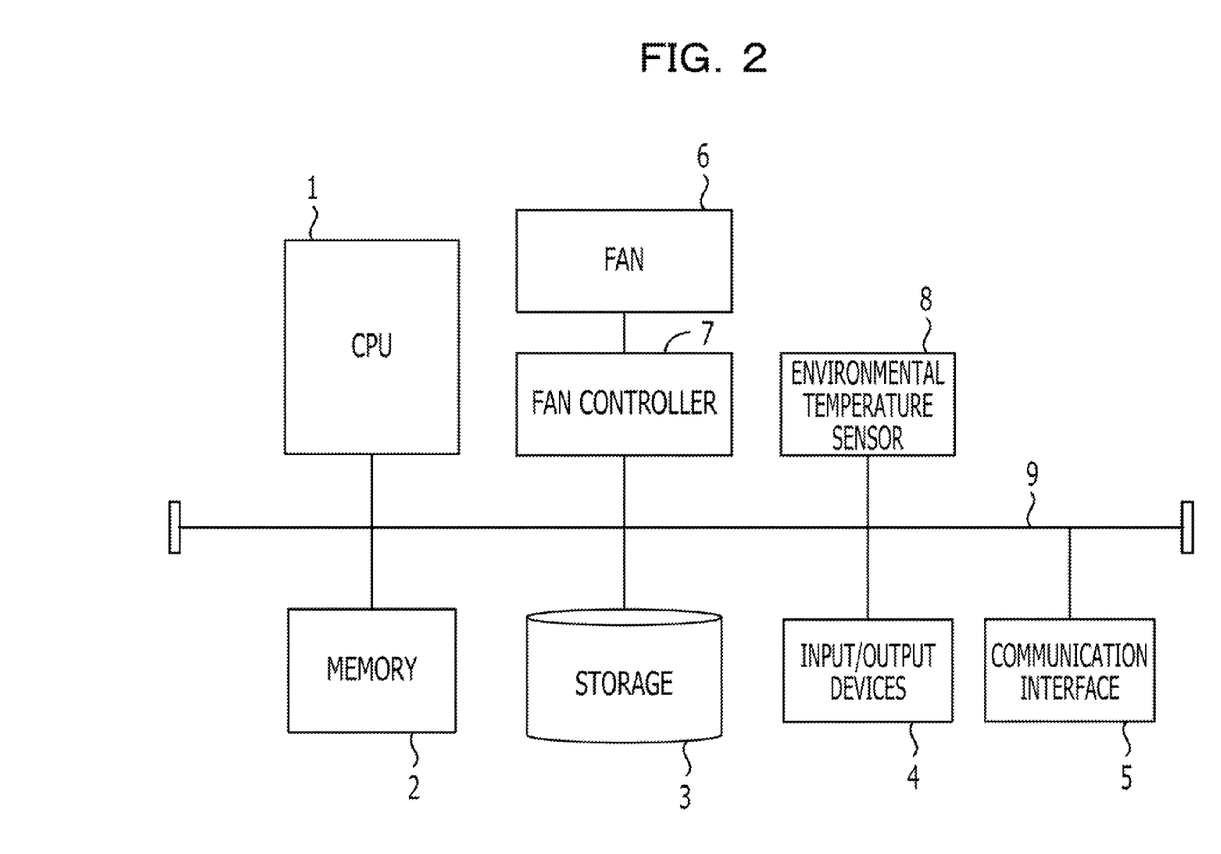
FIG. 2 illustrates an example of a server hardware configuration.

FIG. 2 illustrates an example of a server hardware configuration. A server includes a CPU 1, a memory 2 in which programs to be implemented by the CPU 1 are loaded and data used in the CPU processing is stored, and a storage 3 that stores programs and various types of data. The memory 2 may be, for example, a RAM (Random Access Memory) and the storage 3 may be, for example, a HDD (Hard Disk Drive) or flash memory. The server further includes input/output devices 4 and a communication interface 5 that enables data communication with external devices. The input/output devices 4 may be a keyboard and a display and the like, and the communication interface 5 may be, for example, a LAN (Local Area Network) card and the like. The server further includes a fan 6 that cools the CPU 1, a fan controller 7 that controls the rotation of the fan 6, and an environmental temperature sensor 8 that detects an environmental temperature. All the configuration elements are connected through a bus 9.

Figure 3:
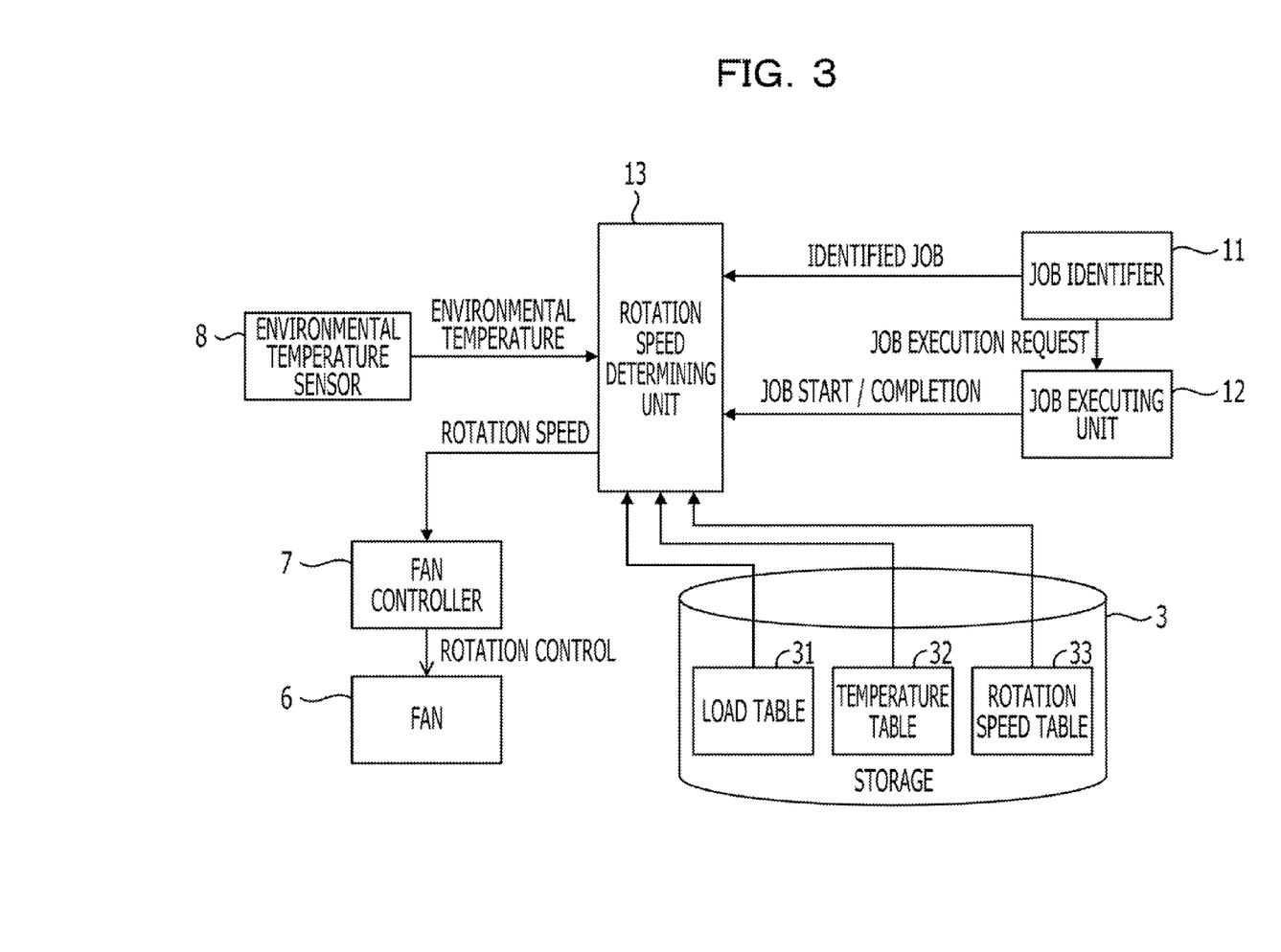
FIG. 3 is an example server function block diagram.

FIG. 3 is a function block diagram related to fan rotation control in the above-described server. The server includes a job identifier 11, a job executing unit 12, and a rotation speed determining unit 13 whose functions are carried out through the execution of programs by the CPU 1. The storage 3 includes a load table 31, a temperature table 32, and a rotation speed table 33. The rotation speed of the fan is a value that corresponds to the number of rotations of the fan within a specific time. As described above, the server includes the fan 6, the fan controller 7, and the environmental temperature sensor 8.

When a job to be executed by the CPU 1 is generated, the job identifier 11 identifies the type of the generated job. The generation of a job may be, for example, caused by the input of a job execution request by a user through the input/output devices 4, or caused by the reception of a job execution request from another device through the communication interface 5. Furthermore, a job may be generated due to the operation of various mechanisms inside the server or due to the execution of another job. The job identifier 11 reports the generated job execution request to the job executing unit 12, and reports the contents of the identified job to the rotation speed determining unit 13.

The job executing unit 12 executes jobs. The job executing unit 12 reports the start and completion of job executions to the rotation speed determining unit 13.

The rotation speed determining unit 13 refers to the load table 31 to specify a load on the CPU 1 when the reported job is executed, when the job identified by the job identifier 11 is reported. In other words, the rotation speed determining unit 13 predicts the load on the CPU 1 when the reported job is being executed by referring to the load table 31. Next, the rotation speed determining unit 13 refers to the temperature table 32 to specify the temperature of the CPU 1 under the above-described load on the CPU 1. At this time, the rotation speed determining unit 13 specifies the temperature of the CPU 1 while taking into account an environmental temperature detected by the environmental temperature sensor 8. Moreover, the rotation speed determining unit 13 refers to the rotation speed table 33 to specify a rotation speed of the fan 6 corresponding to the specified temperature, and reports the rotation speed to the fan controller 7. The fan controller 7 receives the report and controls the rotation of the fan 6 to rotate at the reported rotation speed. In other words, the rotation speed determining unit 13 and the fan controller 7 function as a fan control unit to control the fan.

Figure 4:
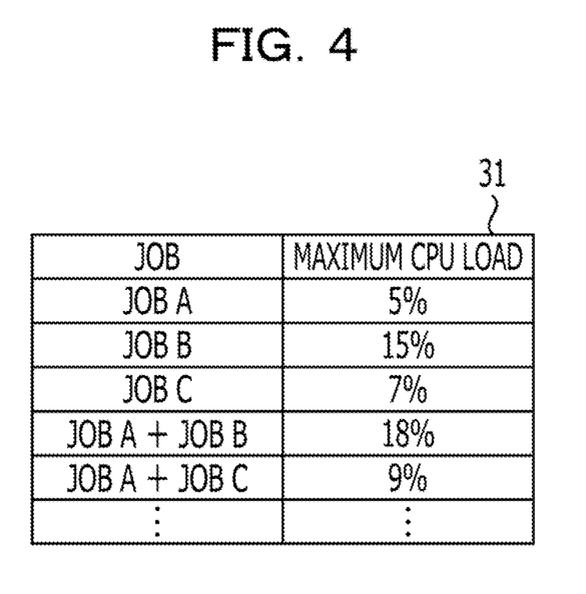
FIG. 4 is an example of a load table.

The load table 31 contains information on CPU loads corresponding to the type of job executed by a CPU. In this specification, the types of jobs executed by the CPU may refer to, for example, the contents of jobs executed by the CPU such as individual jobs or multiple jobs grouped according to functions and the like of the jobs. In the present embodiment, the load table 31 contains information on the maximum possible load on the CPU 1 when executing a job as illustrated in FIG. 4. The load table 31 may contain information on a CPU load corresponding to a job or multiple jobs at the same time.

Figure 5:
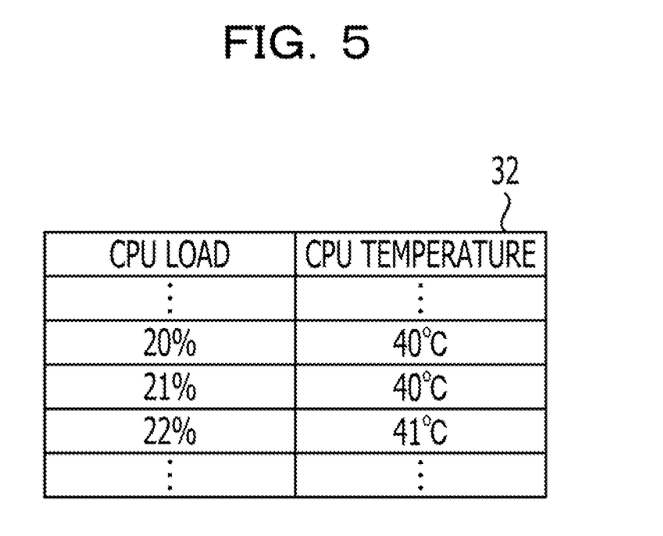
FIG. 5 is an example of a temperature table.

The temperature table 32 contains information on relation of the load on the CPU 1 and the temperature of the CPU 1 under the particular load as illustrated in FIG. 5. The CPU temperature data contained in the temperature table 32 is a temperature under a certain environment temperature (for example, 25 degrees Celsius).

Figure 6:
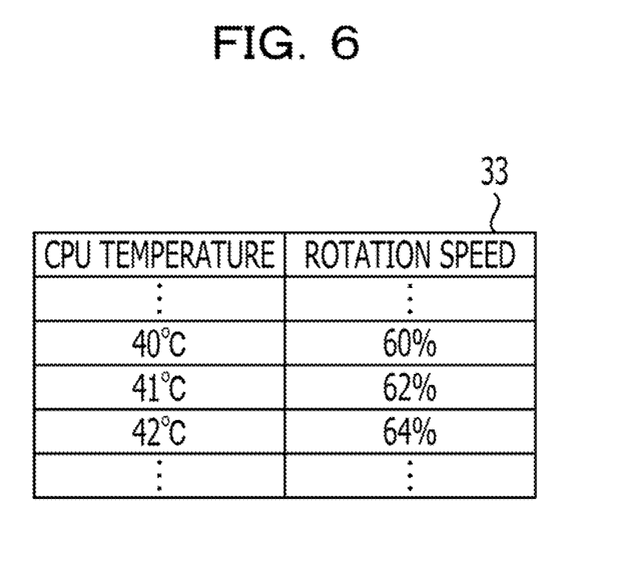
FIG. 6 is an example of a rotation speed table.

The rotation speed table 33 contains information on rotation speed of the fan 6 which is changed in accordance with the CPU 1 temperature as illustrated in FIG. 6. The fan 6 rotation speed according to the CPU 1 temperature is, in other words, a fan rotation speed suitable for cooling the CPU 1 at a certain temperature of the CPU 1. In the present embodiment, control of the fan 6 rotation is based on PWM (pulse width modulation). In this case, the rotation speed table 33 contains a duty ratio (%) of the pulse wave as the rotation speed.

Figure 7:
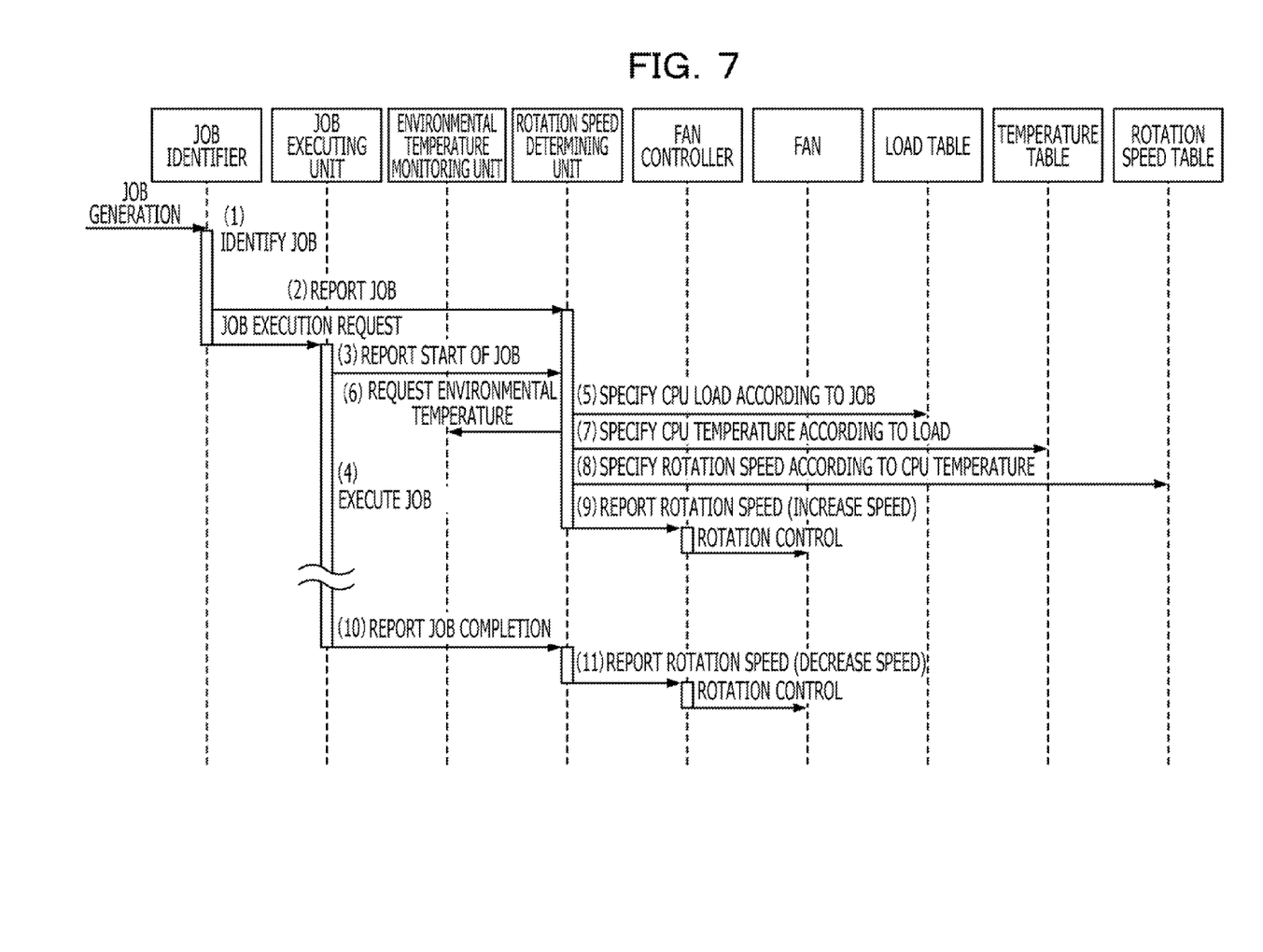
FIG. 7 is a sequence diagram of an example of fan control processing.

The following explanation describes the fan control processing of the server. FIG. 7 is a sequence diagram illustrating fan control processing. Processes (1) to (10) illustrated in FIG. 7 will be described below. (1) The job identifier 11 identifies the job when a job to be executed is generated. (2) The job identifier 11 reports the identified job to the rotation speed determining unit 13 and reports job execution request to the job executing unit 12. The processing for reporting the identified job to the rotation speed determining unit 13 and for reporting job execution request to the job executing unit 12 may be conducted at the same time or one after another. (3) The job executing unit 12 reports the start of the execution of the job reported by the job identifier 11 in process (2) to the rotation speed determining unit 13. (4) The job executing unit 12 executes the job reported by the job identifier 11 in process (2). (5) The rotation speed determining unit 13 receives the report of the start of the execution of the job from the job executing unit 12 in process (3), and specifies the maximum CPU load corresponding to the job to be executed indicated by the job identifier 11 in process (2), by referring to the load table 31.

If there is another job already being executed at this time, the rotation speed determining unit 13 refers to the load table 31 to specify the CPU 1 loads corresponding to the job reported by the job identifier 11 and the job already being executed. For example, when a job A is already being executed and a job B is reported by the job identifier 11 that the job B is also to be executed, the state of executing the generated job B becomes the state of executing both job A and job B.

The rotation speed determining unit 13 specifies the maximum CPU load corresponding to job A and job B as 18% according to the contents of the load table 31 as illustrated in FIG. 4. In other words, the rotation speed determining unit 13 predicts that the maximum CPU load under the state of job A as well as job B being executed will be 18%. (6) The rotation speed determining unit 13 asks the environmental temperature sensor 8 for the environmental temperature to obtain the environmental temperature (Ta). (7) The rotation speed determining unit 13 refers to the temperature table 32 to specify the CPU temperature of the CPU 1 under the maximum CPU load specified in process (5).

The rotation speed determining unit 13 then calculates the CPU temperature while taking into account the environmental temperature. Specifically, the rotation speed determining unit 13 adds the difference (Ta−Ta') derived by subtracting an environmental temperature Ta' in temperature table 32 from the environmental temperature Ta obtained in process (6), to the CPU temperature if the CPU temperature under the environmental temperature Ta' state is contained in the temperature table 32. For example, when the CPU temperature of the environmental temperature Ta' contained in the temperature table 32 is 25 degrees Celsius, the specified CPU temperature from the temperature table 32 is 40 degrees Celsius, and the environmental temperature Ta obtained in process (6) is 30 degrees Celsius, the CPU temperature is calculated as 40+(30−25)=45.

(8) The rotation speed determining unit 13 refers to the rotation speed table 33, specifies the fan 6 rotation speed corresponding to the CPU temperature calculated in process (7), and determines the specified rotation speed as the rotation speed to be reported to the fan controller 7. (9) The rotation speed determining unit 13 reports the fan 6 rotation speed determined in process (8) to the fan controller 7. In other words, the rotation speed determining unit 13 instructs the fan controller 7 to increase the rotation speed of the fan 6 to the rotation speed corresponding to the condition of the jobs being executed.

The fan controller 7 controls the fan 6 to rotate at the rotation speed reported by the rotation speed determining unit 13. (10) The job executing unit 12 reports the completion of the job execution to the rotation speed determining unit 13 when the job is completed. (11) The rotation speed determining unit 13 reports the fan 6 rotation speed corresponding to the CPU load to the fan controller 7 while jobs other than the job reported as completed by the job executing unit 12 in process (10) are being executed among the currently active jobs.

The processing to determine the fan 6 rotation speed at this time is substantially the same as described above in processes (5) to (8). In other words, the rotation speed determining unit 13 instructs the fan controller 7 to reduce the fan 6 rotation speed in line with the amount the CPU load was reduced due to the completion of the job. As a result, the fan controller 7 controls the fan 6 to rotate at the rotation speed reported by the rotation speed determining unit 13.

In the fan control processing, the processes from (5) to (9) may be initiated when the job identifier 11 reports the identified job in process (2) without waiting for the reporting of the start of the job execution by the job executing unit 12 in process (3).

Based on the above-described fan control processing, the CPU load can be predicted according to the job to be executed and the fan can be controlled to rotate at a speed that corresponds to a CPU temperature under the predicted CPU load at the start of the execution of the job. In other words, the fan control processing is conducted not when the temperature meets or exceeds a fixed value, but rather when the execution of a job is started. Thus, the fan rotation speed is increased so as to suitably reduce the CPU temperature which is to be increased based on the CPU load according to the job execution.

Figure 8:
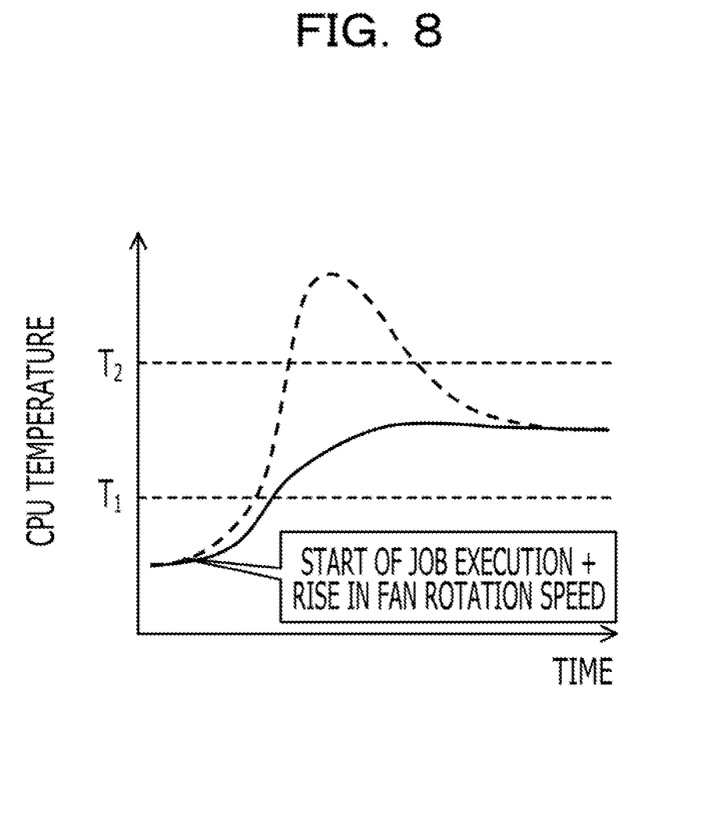
FIG. 8 is a graph illustrating an example of a CPU temperature curve when a job execution is started and the fan rotation speed is increased.

FIG. 8 illustrates an example of variation in the CPU temperature when the above-described fan control processing is conducted. The graph in FIG. 8 describes the passage of time on the horizontal axis and temperature on the vertical axis in the same way as FIG. 1. In FIG. 8, the CPU temperature curve when the fan rotation speed is increased after the CPU temperature rises the threshold (T1) is indicated by a dotted line, and the CPU temperature curve when the fan rotation speed is increased when the job is started as in the fan rotation control processing described above is indicated by a solid line. In comparing the two temperature curves, the CPU temperature curve based on the above-described fan rotation control processing describes a gentle rise in the CPU temperature since the fan rotation speed is increased earlier when the execution of the job is started. The CPU temperature remains stable and does not exceed the certain threshold (T2) after a certain amount of time has passed. As a result, damage to the IC due to an excessive rise in the CPU temperature can be avoided and a reduction in the CPU processing performance can be reduced or prevented. Moreover, power consumption can be reduced since an increase in leakage current due to an excessive rise in the CPU temperature is reduced or prevented.

Moreover, instead of simply increasing the fan rotation speed earlier, the above-described fan control processing selects a suitable fan rotation speed to cope with the rise in the CPU temperature that depends on the CPU load for a job to be executed and the rise in temperature caused by the CPU load. As a result, CPU cooling can be conducted without causing wasteful power consumption by rotating the fan more than necessary.

Moreover, the fan rotation speed can be increased in response to the maximum load to ensure that the rise in the CPU temperature is not excessive since information on the maximum possible load, which can occur on the CPU when jobs are executed, is contained in the load table 31. The load table 31 may also contain, for example, information on average loads on the CPU when jobs are executed instead of the maximum possible loads on the CPU.

In the fan control processing according to the above-described embodiment, the fan rotation speed is determined based on the CPU temperature and the fan is rotated according to the determined rotation speed. However, the fan control processing may include, for example, determining a fan rotation interval (or rotation rate and the like) based on the CPU temperature and controlling the fan to rotate intermittently according to the determined fan rotation interval instead of determining the rotation speed. In this case, the fan rotation rate may be determined by referring to a table that contains information on fan rotation intervals corresponding to CPU temperatures instead of the table that contains information on fan rotation speeds corresponding to CPU temperatures. Accordingly, the fan may be controlled to rotate intermittently at the determined rotation interval.

Moreover, the CPU temperature according to the CPU load is specified by referring to the temperature table 32 in the above-described fan control processing according to the present embodiment. However, the present embodiment is not limited to this method and the temperature may be specified, for example, using an equation to calculate the CPU temperature based on a certain parameter of the CPU load. Similarly, the fan rotation speed determination is not limited to referring to the rotation speed table 33 and the rotation speed may be determined, for example, using an equation to calculate the rotation speed based on a certain parameter of the CPU temperature.

For example, when CPU loads corresponding to job groups instead of individual jobs are contained in the load table 31, the job identifier 11 may specify a group that contains a job to be executed and then report the specified group to the rotation speed determining unit 13.

In the above-described fan control processing illustrated in FIG. 7, the rotation speed determining unit 13 controls the rotation of the fan concurrently with the job execution as well as with the start of the job execution. The following is an explanation of an alternative embodiment in which the job execution is started after the rotation speed determining unit 13 controls the fan rotation.

Figure 9:
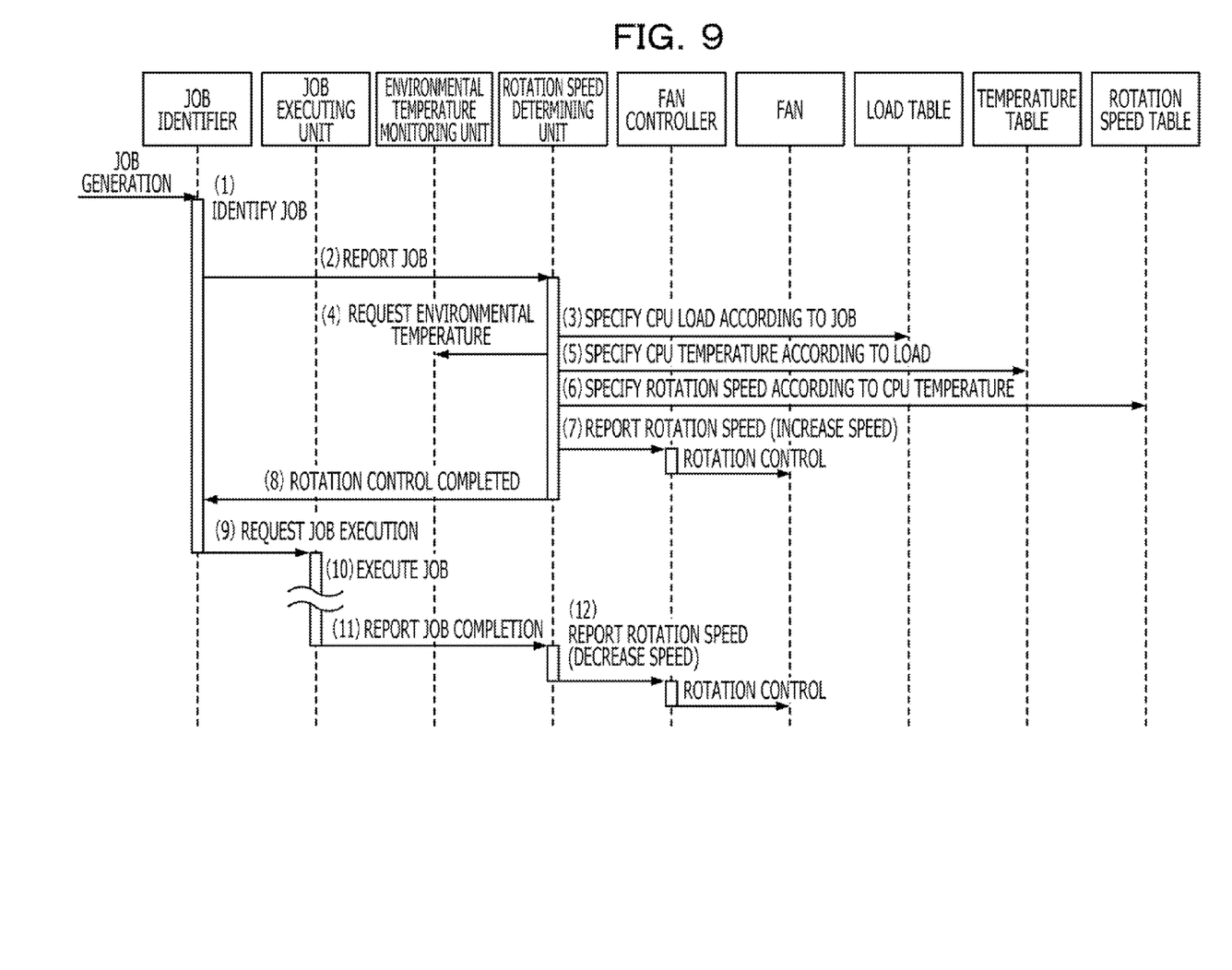
FIG. 9 is a sequence diagram of an example of fan control processing.

FIG. 9 is a sequence diagram illustrating fan control processing according to an alternative embodiment. Processes (1) to (12) illustrated in FIG. 9 will be described below. (1) The job identifier 11 identifies the job to be executed when the job is generated. (2) The job identifier 11 reports the identified job to the rotation speed determining unit 13. Processes (3) to (7) are substantially the same as processes (5) to (9) described above in FIG. 7 and explanations thereof will be omitted. (8) The rotation speed determining unit 13 reports that the fan 6 rotation speed was reported to the fan controller 7 to the job identifier 11. The fan 6 rotation control by the fan controller 7 is conducted immediately upon receiving the report of the fan 6 rotation speed. As a result, the rotation speed determining unit 13 substantially reports that the control of the fan 6 rotation speed is completed to the job identifier 11. (9) The job identifier 11 reports the job execution request to the job executing unit 12. (10) The job executing unit 12 executes the job reported by the job identifier 11 in process (9). Processes (11) to (12) are substantially the same as processes (10) to (11) described above in FIG. 7 and explanations thereof will be omitted.

According to the fan control processing of the alternative embodiment, the fan rotation speed is controlled based on the job to be executed. As a result, an excessive rise in the CPU temperature can be more reliably reduced or prevented than increasing the rotation speed of the fan concurrently with the execution of the job according to the above-described fan control processing illustrated in FIG. 7.

(Second Embodiment)

In addition to the fan control processing of the first embodiment, a second embodiment includes a process to learn a CPU load when job information that is not contained in the load table 31 is executed and add the CPU load information to the load table 31.

The hardware configuration of the server according to the second embodiment is similar to the hardware configuration of the server according to the first embodiment illustrated in FIG. 1, and an explanation thereof will be omitted.

Figure 10:
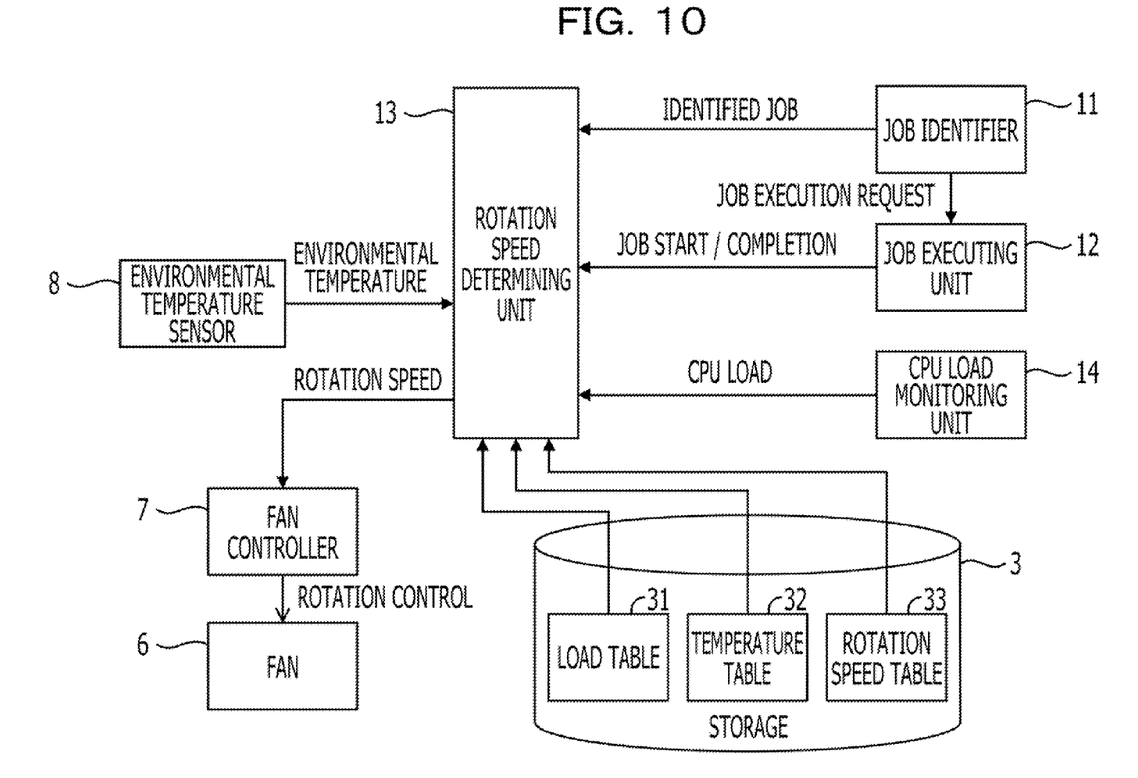
FIG. 10 is an example server function block diagram.

FIG. 10 is a function block diagram illustrating a server according to the second embodiment. The server of the second embodiment further includes a CPU load monitoring unit 14 that monitors the CPU load when a job is being executed in addition to the job identifier 11, the job executing unit 12, and the rotation speed determining unit 13, all of which are functions that are implemented through programs executed by the CPU 1. Moreover, the server includes the fan 6, the fan controller 7, and the environmental temperature sensor 8, and the storage 3 contains the load table 31, the temperature table 32 and the rotation speed table 33 as described above in the first embodiment.

Figure 11:
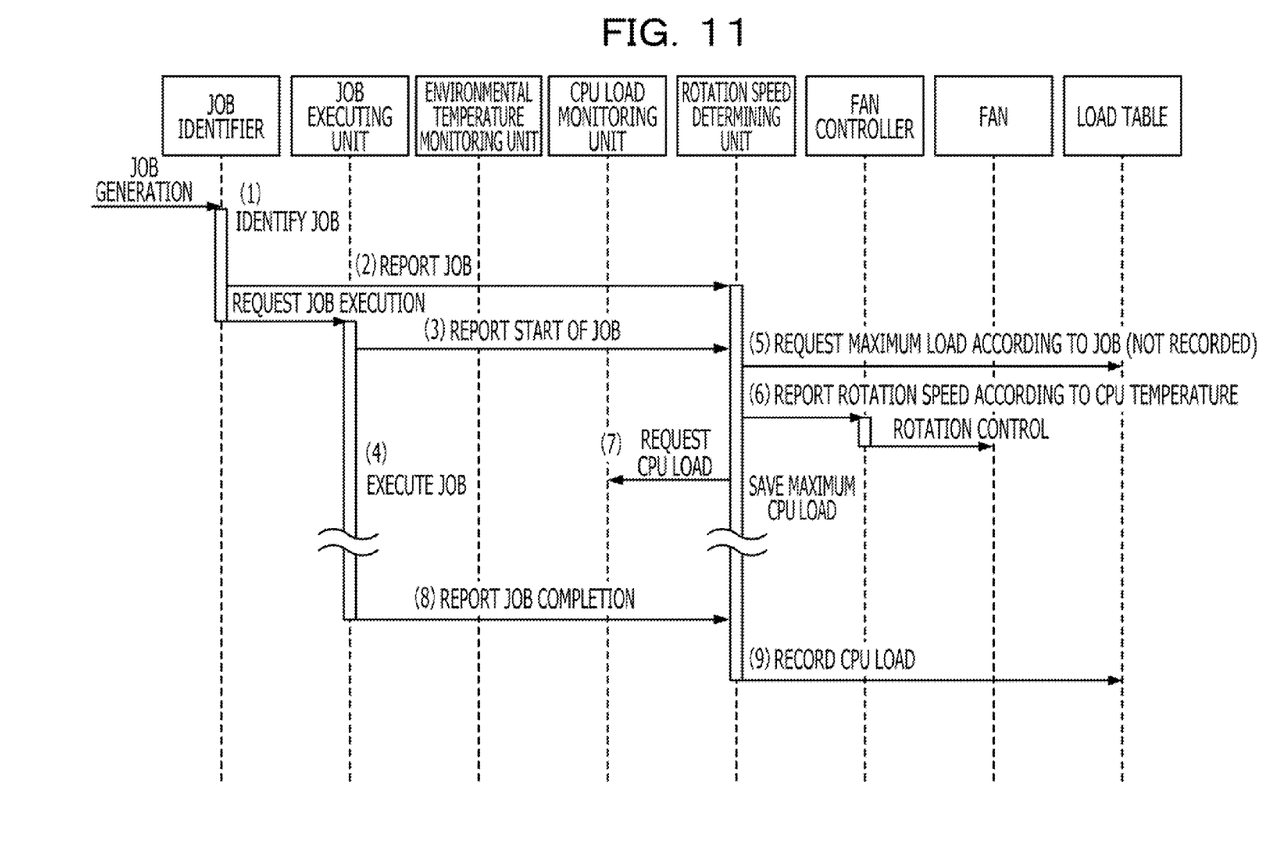
FIG. 11 is a sequence diagram of an example of fan control processing.

FIG. 11 illustrates processing when the CPU load of a generated job is not recorded in the load table 31 as part of the fan control processing according to the second embodiment. The processing related to CPU loads of generated jobs that are recorded in the load table 31 is substantially the same as the first embodiment and description thereof will be omitted. Processes (1) to (12) illustrated in FIG. 11 will be described below.

(1) The job identifier 11 identifies the job when a job to be executed is generated. (2) The job identifier 11 reports the identified job to the rotation speed determining unit 13 and reports the job execution request to the job executing unit 12. (3) The job executing unit 12 reports the start of the execution of the job indicated by the job identifier 11 in process (2) to the rotation speed determining unit 13. (4) The job executing unit 12 executes the job reported by the job identifier 11 in process (2). (5) The rotation speed determining unit 13 refers to the load table 31 to attempt to specify the maximum CPU load according to the job reported by the job identifier 11 in process (2). If there is a job currently being executed by the job executing unit 12, the rotation speed determining unit 13 attempts to specify the CPU load according to both the job reported by the job identifier 11 and the job currently being executed. However, in this case, the CPU load corresponding to the reported job is not recorded in the load table 31.

(6) The rotation speed determining unit 13 instructs the fan controller 7 to control the rotation according to an actual CPU temperature detected by a temperature sensor (not shown) that detects the CPU temperatures while the job is being executed by the job executing unit 12. The fan controller 7 controls the fan 6 rotation according to the instruction. (7) The rotation speed determining unit 13 obtains CPU loads of the job being executed from the CPU load monitoring unit 14 as the job is being executed by the job executing unit 12 while the processing in process (6) is being performed.

Then, the maximum CPU load among the obtained CPU loads is saved. Specifically, the rotation speed determining unit 13 obtains, for example, CPU loads from the CPU load monitoring unit 14 at certain times and saves the obtained CPU loads in a work region. Next, the rotation speed determining unit 13 updates the values in the work region with newly obtained CPU loads when CPU loads that are larger than the saved CPU loads are newly obtained. If there is a job currently being executed by the job executing unit 12, the rotation speed determining unit 13 obtains the loads of the CPU 1 according to both the job reported by the job identifier 11 and the job currently being executed. When CPU loads corresponding to each job are temporarily saved in the load table 31 (when CPU loads corresponding to a combination of multiple jobs are not saved), it is difficult to obtain the unique CPU load for the job related to the execution request if there is already a job being executed. As a result, the CPU loads may not be obtained in this case.

(8) The job executing unit 12 reports the completion of the job execution to the rotation speed determining unit 13 when the job is completed. (9) The rotation speed determining unit 13 records the maximum CPU load saved in process (7) in association with the job being executed by the job executing unit 12, in the load table 31.

The recording of the CPU loads in the load table 31 in process (9) may be conducted any time after reporting the completion of the execution of the job by the job executing unit 12 in process (8) regardless of the timing of the fan control processing in process (6).

Moreover, in process (6), the rotation speed determining unit 13 instructs the fan controller 7 to control the rotation according to the actual CPU temperature. However, the fan rotation speed may be uniformly increased by a certain rotation speed when no CPU load corresponding to the job is recorded in the load table 31. In this case, a process of reducing the fan rotation speed when the execution of the job is completed is desired.

According to the processing of the second embodiment, the maximum CPU load of a new job that is not recorded in the load table 31, is automatically recorded in the load table 31. As a result, the next time the job is executed, the fan can be rotated at the rotation speed according to the CPU load of the particular job when the execution of the job is started (or before the execution of the job is started). Therefore, a server administrator does not need to set the CPU load in the load table 31 for the new job.

The load table 31 may also contain information on average loads, for example, of the CPU 1 when jobs are executed instead of the maximum possible loads on the CPU 1 when jobs are executed in the same way as the first embodiment. In this case, in process (7) of the second embodiment, for example, an average value of the loads on the CPU 1 may be calculated and the average values recorded in the load table 31 instead of saving the obtained maximum possible loads on the CPU 1 while the job is being executed.

The execution of jobs in the fan control processing described above in the first and second embodiments is not limited to a server, and a CPU may execute the jobs. In principle, any type of information processor having a mechanism to cool a CPU with a fan may be applicable. Moreover, storage and the like which contains data to be referred to in the fan control processing may not be included in the same device as the device that conducts the fan control processing, and instead may be included, for example, in another device that is communicably connected to the processing device. Furthermore, an object of the cooling conducted by the fan cooling processing is not limited to a CPU, and instead may be applicable to processors in general having information processing functions (mathematical functions). Moreover, functional and physical configurations of the above-described information processor are not limited to the above-described conditions, and the functions and physical resources may be, for example, provided in an integrated or further distributed manner.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present invention has(have) been described in detail, it should be understood that the various changes, substitutions, and alterations could be made hereto without departing from the spirit and scope of the invention.

What is claimed is:

1. A computer-readable, non-transitory medium storing a fan control program that causes a computer to execute a procedure, the computer having a processor and a fan that cools the processor, the procedure comprising:

predicting a load of the processor for a job to be executed by referring to a memory that stores information on the load of the processor according to a job type;

determining fan rotation control according to a temperature of the processor under the load; and controlling the fan according to the determined fan rotation control.

2. The computer-readable, non-transitory medium according to claim 1, wherein the control processing obtains information on a load condition of the processor after execution of the job has started and stores the information in the memory, when information on the load of the processor corresponding to the job type that is to be executed is not stored in the memory.

3. The computer-readable, non-transitory medium according to claim 1, wherein information on a maximum possible load of the processor when a job is being executed is stored in the memory according to the job type.

4. A computer having a processor and a fan to cool the processor, the computer comprising:
   a memory storing information on a processor load according to a job type; and
   a control unit that refers to the memory, predicts the processor load for the job to be executed, determines fan rotation control according to a temperature of the processor in a state under the load, and controls the fan according to the determined fan rotation control.

5. A fan control method performed by a computer having a processor and a fan, the method comprising:
   predicting a load of the processor for a job to be executed by referring to a memory that stores information on the load of the processor according to a job type;
   determining fan rotation control according to a temperature of the processor under the load; and
   controlling the fan according to the determined fan rotation control.

* * * * *